United States Patent Office 3,592,717
Patented July 13, 1971

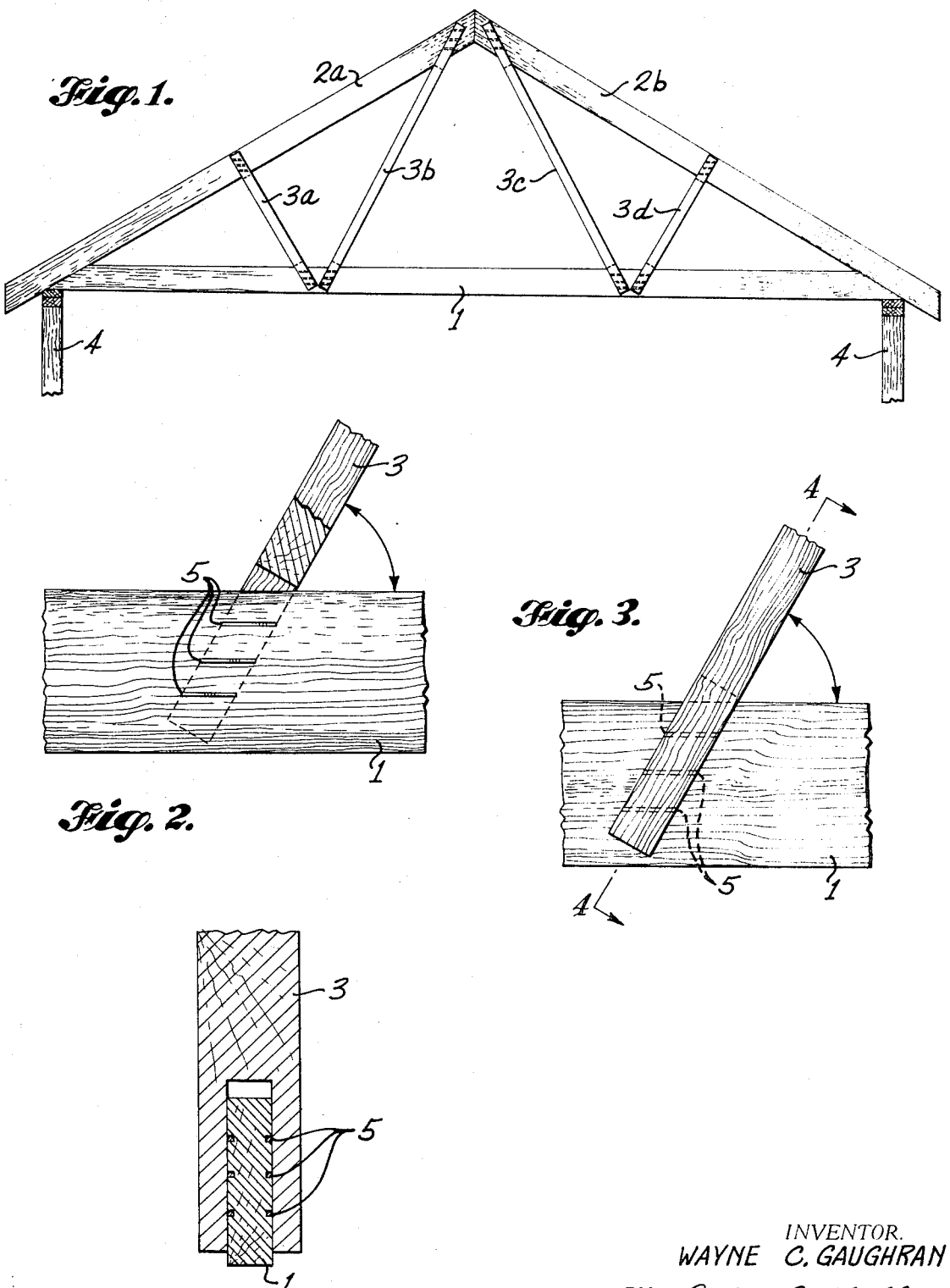

3,592,717
GLUED JOINT WITH INTEGRAL ADHESIVE KEY
Wayne C. Gaughran, Seattle, Wash., assignor to
Weyerhaeuser Company, Tacoma, Wash.
Filed July 20, 1967, Ser. No. 654,756
Int. Cl. C09j 5/02; E04b 1/00; F16b 17/00
U.S. Cl. 161—56                                    9 Claims

ABSTRACT OF THE DISCLOSURE

A structural wood joint of increased strength and a method of making the same wherein the grain directions of the wood mating members of the joint are at an angle to each other. The joint comprises wood mating members joined together with an adhesive, at least one of the mating members having an integral adhesive "key" formed by cutting at least one slot of a predetermined size and shape within the adhesive area of the surface of the mating member whose grain direction is at an angle other than zero to the load resultant imposed on the joint, the slot being filled with adhesive.

BACKGROUND OF THE INVENTION

In the assembly of wood members, glued joints are frequently employed wherein the grain directions of the mating wood members making up the joint are at an angle to one another so that the grain of one or several of the members have an angle of greater than zore with the resultant of a load imposed on the joint. It is known that glued joints are strongest when all mating pieces are oriented with their grain directions parallel or at zero degrees to the load direction. Joint strength decreases as the angle between the grain directions of the mating pieces and the load resultant increases from zero to 90°. Thus, in a glued joint, the joint strength is largely controlled by the mating member whose grain direction is at an angle to the load resultant and failure will normally occur in this member before occurring in the other mating member.

Mechanical "keys," such as bolts, split rings, and shear plates, have been used as wood connector joints to give them increased strength. Associated with most mechanical "keys," however, is the problem of joint slip which seriously reduces the effectiveness of the joint. The end result of joint slip in structural components, such as trusses, is undesirable deflection and set. While this set and deflection can be compensated for in design, it adds to the cost of construction.

The instant invention uses an integral adhesive "key" which has distinct advantages over any type of mechanical "key" in that, because it is an integral part of the assembly, it contributes to the joint strength and stiffness immediately upon application of a load. The integral adhesive "key" also has advantages in fabrication.

SUMMARY

This invention has for its main object the provision of a glued wood joint having increased strength wherein the joint contains mating pieces having grain directions at an angle to the applied load.

Another object of the invention is to provide a method of making a wood joint having an integral adhesive "key," the wood joint being of increased strength.

In its broadest aspects the above objects and others are accomplished by providing a structural joint of increased strength comprising at least two wood mating members joined together by an adhesive with their grain directions at an angle to one another. The mating member whose grain direction is at an angle other than zero degrees to a force imposed on the joint has at least one slot of predetermined dimensions cut within the glue area of the surface thereof, the slot being filled with adhesive.

BRIEF DESCRIPTION OF THE DRAWINGS

FIG. 1 illustrates a standard truss construction used in domestic housing in which the new structural joint is employed.

FIG. 2 is a fragmentary exploded view illustrating the structural joint described herein.

FIG. 3 is an additional fragmentary exploded view illustrating the structural joint of this invention.

FIG. 4 is in a cross section of the structural joint taken along line 4—4.

DETAILED DESCRIPTION OF THE DRAWINGS

The problem of increasing the strength of wood joints which contain mating pieces with grain directions at an angle to the applied load is one of general interest. By forcing the joint failure into the mating piece having a grain direction of zero to the load resultant, by increasing the strength of the member or members loaded at some angle to the grain, or by increasing the failure load to that which would be expected if all mating members were oriented with their grain directions at zero degrees to the load resultant, the strength of the overall joint can be increased.

By cutting at least one slot within the glue area of the surface of the mating member whose grain is at an angle other than zero degrees to the load resultant and assembling two or more wood members together with an appropriate adhesive, it has been found that the joint is stronger than a joint without such slots. This is of importance in the design of structural members such as trusses used in residential and industrial construction. The slot or slots should be cut within the glue area of the surface of the mating member whose grain direction is at an angle other than zero to the force imposed on the joint, for in a glued joint of this nature failure will normally occur in the mating member whose grain direction is at an angle to the load resultant rather than occurring in the member whose grain direction is parallel or at zero degrees to the load resultant. Slots may also be cut in the corresponding member if desired. If stress transfer plates such as truss gussets are used, slots will normally be cut in the face of the member abutting the transfer plate whose grain is at an angle to the load.

Reference may be made to the drawings for further clarification of the structural joint of this invention. FIG. 1 illustrates a conventional truss used in domestic housing where 1 is the lower chord, 2a and 2b are the upper chords and 3a, 3b, 3c and 3d are the webs. Reference numeral 4 designates a portion of the side wall construction.

The structural joint of this invention is further illustrated in FIGS. 2, 3, and 4. As shown, slots 5 are cut in the surface of the member whose grain direction is at an angle to the resultant of the applied load. The configuration of the slots shown is for purposes of illustration only.

The configuration of the slot appears to be of little consequence. The slots may be parallel, circular, at an angle, crossed, or other geometric shape. Best results have been obtained with a slot having an X configuration.

The particular adhesive used in joining the wood mating members may be any of the conventional known adhesives used for bonding wood members together. Such adhesives include the epoxy resins, phenol-formaldehyde resins, resorcinol-formaldehyde resins, melamine-formaldehyde resins, and others. Epoxy resins are a preferred type because of their freedom from shrinkage on curing.

After cutting a slot or slots in the appropriate wood mating member, the surfaces to be bonded are spread with an appropriate adhesive and the joints are assembled. It is important that the slot or slots be filled with the adhesive.

The size, that is the width and depth of the slots, should be large enough to result in an increase in the joint strength of the glued joint over that when no slots are used.

It is to be understood that more than two wood members may be involved in making up a particular joint.

The following examples are given as exemplary of this invention and are not intended to be limiting in any manner.

Example I

Douglas fir pieces about 2 inches wide were used as the mating members in a series of tests. Each sample had approximately 3 square inches of glue area. 124 block shear specimens were fabricated and tested at different load to grain angles at 15° increments from zero to 90°. Five general types of glued joints were tested. Type I was a control joint having no slots cut in the mating member with its grain direction at an angle other than zero to the applied force. Type II consisted of a joint having an angled slot 1½ inches long, ⅛ inch wide, and 3/16 inch deep. Type III consisted of a pair of slots of the same size as the type II slot cut parallel to one of the sides of the wood member. Type IV comprised a circular slot 1½ inches in diameter with a center hole ¼ inch in diameter. Type V consisted of a single slot cut parallel to one side of the block specimen.

Adhesive was spread on a series on each of the specimens and each of the glued joints was tested in a 10,000 lb. testing machine using a standard block shear testing jig and head speed of 0.05 inch per minute. The results are shown in Table I below:

TABLE I

|  | Type | | | | | |
| --- | --- | --- | --- | --- | --- | --- |
|  | I a | II | III | IV | V |  |
| 0° | 4,306 | 4,353 | 3,788 | 4,108 |  | Average load. |
|  | 100 | 101 | 88 | 95 |  | Percent of control. |
| 15° | 3,802 | 3,850 | 3,865 | 4,428 | 3,903 | Average load. |
|  | 100 | 101 | 102 | 116 | 103 | Percent of control. |
| 30° | 3,392 | 3,113 | 3,657 | 3,893 | 3,567 | Average load. |
|  | 100 | 92 | 108 | 115 | 105 | Percent of control. |
| 45° | 1,944 | 2,440 | 2,730 | 2,493 | 2,543 | Average load. |
|  | 100 | 126 | 140 | 128 | 131 | Percent of control. |
| 60° | 1,590 | 2,177 | 2,207 | 2,363 | 2,057 | Average load. |
|  | 100 | 137 | 139 | 149 | 129 | Percent of control. |
| 75° | 1,079 | 1,080 | 1,368 | 1,513 | 1,455 | Average load. |
|  | 100 | 100 | 127 | 140 | 135 | Percent of control. |
| 90° | 928 | 1,077 | 1,162 | 1,447 |  | Average load. |
|  | 100 | 116 | 125 | 156 |  | Percent of control. | a Control.

The adhesive used in these joints was an epoxy resin, the press time 7½ hours, temperature 70° F., and relative humidity of 50%.

As can be seen, at angles from 15 to 90° the strength of the joint was increased by the use of the integral adhesive "key." However, even with the addition of the integral adhesive "key" the strength of the joint decreased as the angle was increased over that found at zero degrees wherein both of the mating members have a grain direction parallel to each other.

Example II

Six specimens were fabricated using the same adhesive as in Example I and the same type wood material. In one block an X-shaped slot ⅛ inch wide and 3/16 inch deep was cut. In the corresponding block a similar X cut was made only at 45° to the grain direction. Adhesive was applied to the blocks and the blocks fabricated and tested as described in Example I. The average shear of the specimens was 3468 p.s.i., an increase over the 45° control data obtained in Example I of 178%.

Example III

Four specimens similar to those used in Example I and Example II were fabricated with an X configuration slot as in Example II. The same adhesive was used as used for the previous shear tests, only a caustic extracted bark fiber as described in U.S. Pat. No. 3,245,869 and sold under the trade name WEF by Weyerhaeuser Company was used as a reinforcing agent. An average of the shear test of the four specimens showed an increase over the 45° angle control data obtained in Example of 176%.

Example IV

Three specimens were fabricated with the same configuration as shown in Example II and Example III and a similar adhesive was used only a glass fiber mat reinforcing agent was included in the X slot. The results of the tests showed an average increase over the 45° angle control data obtained in Example I of 230%.

What is claimed is:

1. A structural joint of increased strength comprising at least two wood mating members joined together by an adhesive with their grain directions at an angle to one another, the mating member whose grain direction is at an angle other than zero degrees to a force imposed on the joint having at least one slot of predetermined dimensions cut within the glue area of the surface thereof, the slot being filled with adhesive.

2. The joint according to claim 1 wherein the slot is normal to the grain direction of the mating member having the slot cut therein.

3. The joint according to claim 1 wherein the slot is circular and has a diameter not exceeding that of the glue area.

4. The joint according to claim 1 wherein the slot is at an angle to the grain direction of the mating member having the slot cut therein.

5. The joint according to claim 1 wherein the slot is in the shape of an X.

6. The joint according to claim 1 wherein a slot is cut in each of the wood mating members within the glue area of the joint.

7. A method of making a structural wood joint of increased strength wherein the grain directions of the mating wood members of the joint are at an angle to one another, which comprises:
  (a) cutting at least one slot of predetermined dimensions in the glue area of the mating member whose grain direction is at an angle to a force imposed on the joint,
  (b) spreading an adhesive on at least one surface of the mating member to be joined, the quantity of adhesive being sufficient to fill the slot, and
  (c) assembling and securing said members together to form the joint.

8. The method according to claim 7 wherein the slot has an X configuration.

9. The method according to claim 7 wherein a slot is cut in each of the wood mating members within the glue area of the joint.

References Cited

UNITED STATES PATENTS

| 961,992 | 6/1910 | Underwood | 287—20 |
| 1,726,362 | 8/1929 | Orsenigo | 287—20 |
| 2,263,198 | 11/1941 | Valiton | 144—315 |
| 2,409,383 | 10/1946 | Pedersen | 287—20UX |
| 3,070,923 | 1/1963 | Fellman | 144—309X |

WILLIAM A. POWELL, Primary Examiner

U.S. Cl. X.R.

52—642; 144—315; 156—257, 293; 287—20

PO-1050
(5/69)

UNITED STATES PATENT OFFICE
CERTIFICATE OF CORRECTION

Patent No. 3,592,717      Dated July 13, 1971

Inventor(s) W. C. Gaughran

It is certified that error appears in the above-identified patent and that said Letters Patent are hereby corrected as shown below:

In column 1, line 30, "zore" should read --zero--;

in column 2, line 12, "is in a" should read --is a--;

in column 3, line 50, Table I, "a" should read --c--; and in column 4, line 11, "Example" should read --Example I--.

Signed and sealed this 25th day of January 1972.

(SEAL)
Attest:

EDWARD M. FLETCHER, JR.
Attesting Officer

ROBERT GOTTSCHALK
Commissioner of Patents